(12) United States Patent
Yamashita et al.

(10) Patent No.: US 10,479,176 B2
(45) Date of Patent: Nov. 19, 2019

(54) DOOR HOLE SEAL

(71) Applicants: NISHIKAWA RUBBER CO., LTD., Hiroshima-shi, Hiroshima-ken (JP); HONDA MOTOR CO., LTD., Tokyo (JP)

(72) Inventors: Takashi Yamashita, Hiroshima (JP); Shoichi Yokoyama, Wako (JP); Hiroshi Nakamura, Wako (JP); Katsuya Ashizawa, Haga-machi (JP); Masaya Kunii, Haga-machi (JP)

(73) Assignees: NISHIKAWA RUBBER CO., LTD., Hiroshima-Shi (JP); HONDA MOTOR CO., LTD., Tokyo (JP)

( * ) Notice: Subject to any disclaimer, the term of this patent is extended or adjusted under 35 U.S.C. 154(b) by 157 days.

(21) Appl. No.: 15/703,004

(22) Filed: Sep. 13, 2017

(65) Prior Publication Data
US 2018/0079289 A1 Mar. 22, 2018

(30) Foreign Application Priority Data
Sep. 21, 2016 (JP) ................. 2016-184862

(51) Int. Cl.
| B60J 10/86 | (2016.01) |
| B60J 10/15 | (2016.01) |
| B60J 10/26 | (2016.01) |
| B60J 10/34 | (2016.01) |
| B60J 10/50 | (2016.01) |
| B32B 3/16 | (2006.01) |
| B32B 5/18 | (2006.01) |
| B32B 7/12 | (2006.01) |
| B32B 25/08 | (2006.01) |
| B32B 25/18 | (2006.01) |

(52) U.S. Cl.
CPC ............... *B60J 10/86* (2016.02); *B32B 3/16* (2013.01); *B32B 5/18* (2013.01); *B32B 7/12* (2013.01); *B32B 25/08* (2013.01); *B32B 25/18* (2013.01); *B60J 10/15* (2016.02); *B60J 10/26* (2016.02); *B60J 10/34* (2016.02); *B60J 10/50* (2016.02); *B32B 2266/0207* (2013.01); *B32B 2307/412* (2013.01); *B32B 2581/00* (2013.01)

(58) Field of Classification Search
CPC ....................................................... B60J 10/86
USPC ........................................................ 428/159
See application file for complete search history.

(56) References Cited

U.S. PATENT DOCUMENTS 7,036,868 B2 * 5/2006 Kohara .................. B60J 5/0418
296/146.7

FOREIGN PATENT DOCUMENTS

JP 3890568 B2 3/2007

* cited by examiner

*Primary Examiner* — Brent T O'Hern
(74) *Attorney, Agent, or Firm* — Robert P. Michal, Esq.; Carter, DeLuca & Farrell LLP (57) ABSTRACT

A door hole seal includes: a sheet body configured to operably couple to a door inner panel for covering an opening on the door inner panel; a synthetic resin film for joining the sheet body to the door inner panel, the synthetic resin film being transparent, the synthetic resin film including: an internal circumferential end which sticks to the sheet body; and an outer circumferential end which sticks to an inner-cabin side of the door inner panel by adhesive; and a sheet separation provided at a distance from the sheet body and between an outer circumferential end of the sheet body and the outer circumferential end of the synthetic resin film, the sheet separation adhering to the synthetic resin film.

19 Claims, 10 Drawing Sheets

DOOR HOLE SEAL

CROSS REFERENCE TO RELATED APPLICATION

This application claims the benefit under 35 USC § 119 of JP Patent Application JP 2016-184862 filed Sep. 21, 2016, the entire disclosure of which is incorporated herein by reference.

BACKGROUND INFORMATION

The present invention relates to door hole seals configured to operably couple to inner-cabin sides of door inner panels by synthetic resin films.

Figure 11:
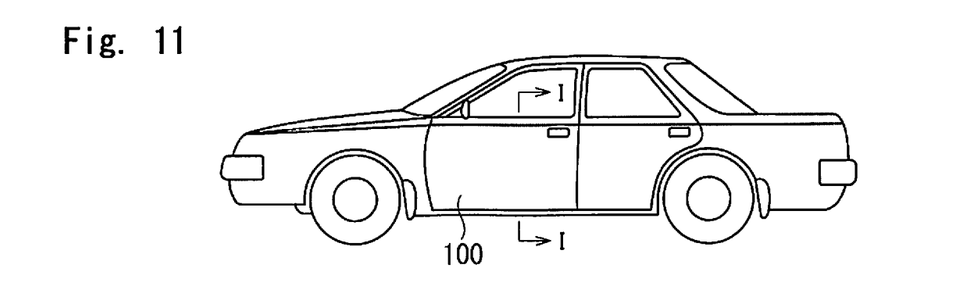
FIG. 11 is an external side view of an automobile.
Figure 12:
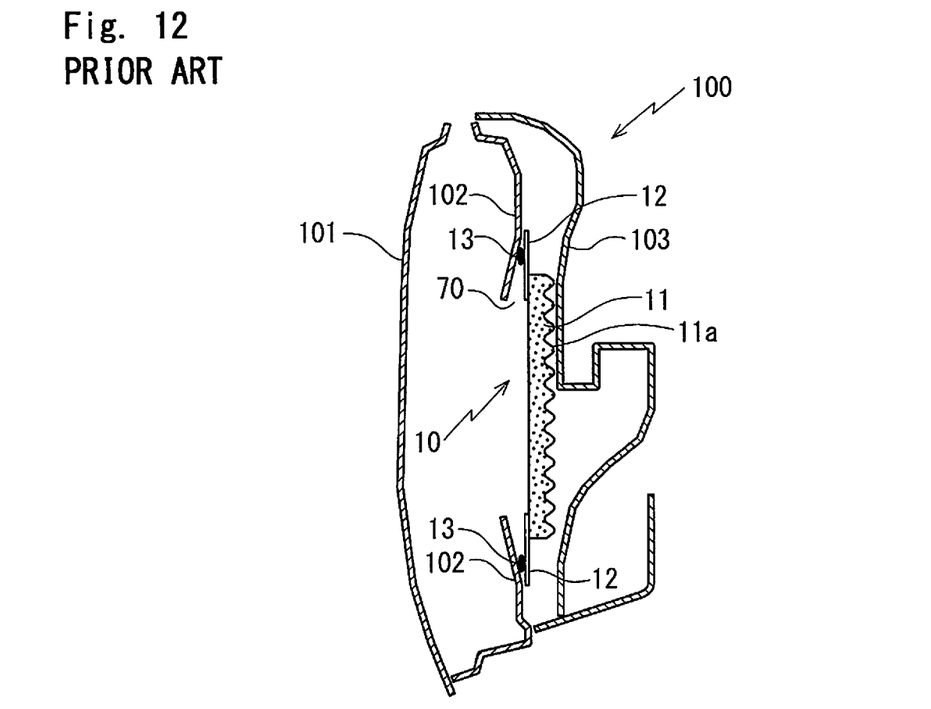
FIG. 12 is an enlarged sectional view of a door hole seal according to a prior art taken along line I-I of FIG. 11 coupling to a door inner panel.

As shown in FIG. 11 and FIG. 12, a door 100 includes a door outer panel 101 and a door inner panel 102. An ordinary door hole seal 10 is provided between the door inner panel 102 and a door trim 103. The door hole seal 10 covers an opening 70 and is used as measures for sound proof property and for securing water proof property inside the door 100. The door hole seal 10 is configured to operably couple to an inner-cabin side of the door inner panel 102.

Figure 13:
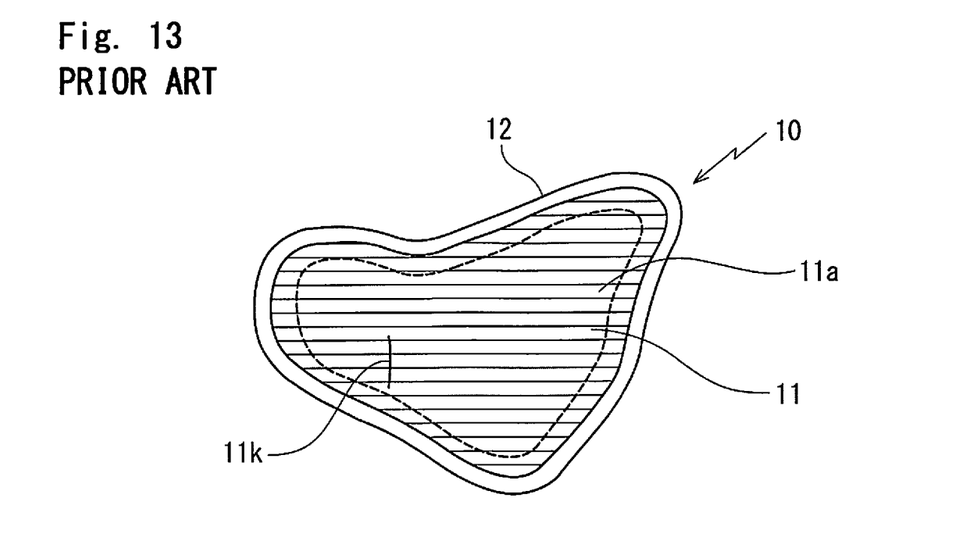
FIG. 13 is a side view of the door hole seal according to the prior art.

As shown in FIG. 13, the door hole seal 10 includes: a sheet body 11, which includes a highly foamed sponge rubber sheet; and a PE (polyethylene) film 12, which is circular in shape and unified with the sheet body 11. A plurality of concaves and convexes 11a are formed on an inner-cabin side of the sheet body 11. Butyl rubber sealing agent 13 as adhesive is provided on an outer-cabin side surface of the PE film 12 for fixing the door hole seal 10 on the door inner panel 102 (see, for example, Japanese examined Patent Publication No. 3890568).

Measures for improving sound absorbing performance of the door hole seal 10 include increasing thickness of the sheet body 11. But the sheet body 11, increased in thickness, often touches the door trim 103, which is on the inner-cabin side of the sheet body 11, and prevents the door hole seal 10 from coupling right.

The door hole seal 10 is configured to operably couple to the inner-cabin side of the door inner panel 102: by fitting the door hole seal 10 on a desired position of the butyl rubber sealing agent 13 applied to an inner-cabin side surface of the door inner panel 102; or by fitting the butyl rubber sealing agent 13, which is applied on an outer-cabin side surface of the PE film 12, on a desired position of the door inner panel 102. Accordingly, positioning the door hole seal 10 or the butyl rubber sealing agent 13 is difficult. Once the butyl rubber sealing agent 13 unintentionally sticks to undesired positions, that is unexpected positions of the PE film 12 or the door inner panel 102 for example, while the door hole seal 10 is being coupled, the butyl rubber sealing agent 13 is hard to tear off. This configuration requires the closest attention from operators.

The PE film 12 as the synthetic resin film is so thin that handling by the operators is visible. Accordingly, coupling the door hole seal 10 to the door inner panel 102 without wrinkles on the PE film 12 requires skill.

Therefore, an object of the present invention is to provide the door hole seals which are simple to couple to the door inner panels and improved in the sound absorbing performance.

SUMMARY

In order to achieve the above-mentioned object, according to one aspect of the invention, a door hole seal (50) is provided, the door hole seal (50) including:

a sheet body (51) configured to operably couple to a door inner panel (102) for covering an opening (70) on the door inner panel (102);

a synthetic resin film (52) for joining the sheet body (51) to the door inner panel (102), the synthetic resin film (52) being transparent or semitransparent, the synthetic resin film (52) including: an internal circumferential end (52a) which sticks to the sheet body (51); and an outer circumferential end (52b) which sticks to an inner-cabin side of the door inner panel (102) by adhesive (53); and a sheet separation (55) provided at a distance from the sheet body (51) and between an outer circumferential end (51b) of the sheet body (51) and the outer circumferential end (52b) of the synthetic resin film (52), the sheet separation (55) adhering to the synthetic resin film (52).

In addition, according to an aspect of the present invention, a plurality of the sheet separations (55) are provided along a curve (80) and at a distance from each other, the curve encircling the sheet body (51) as a whole.

In addition, according to an aspect of the present invention, the sheet separation (55) is long and narrow and extends in a direction that the curve (80) extends.

In addition, according to an aspect of the present invention, the sheet separation (55) protrudes toward an outer side from the outer circumferential end (52b) of the synthetic resin film (52).

In addition, according to an aspect of the present invention, the outer circumferential end (52b) of the synthetic resin film (52) includes a cutout between the sheet separations (55, 55) adjacent to each other along the curve (80), the cutout facing the internal circumferential end (52a).

In addition, according to an aspect of the present invention, the adhesive (53) is provided between the outer circumferential end (51b) of the sheet body (51) and the sheet separation (55), the adhesive (53) encircling the sheet body (51) as the whole.

In addition, according to an aspect of the present invention, the sheet separation (55) includes highly foamed rubber-like elastic body and an outer circumferential surface (55a) of the sheet separation (55), except for an outer-cabin side surface and an inner-cabin side surface, does not include a skin layer.

Symbols in parentheses show constituents or items corresponding to the drawings.

According to the present invention, the sheet separation is provided at the distance from the sheet body and between the outer circumferential end of the sheet body and the outer circumferential end of the synthetic resin film. Also, the sheet separation adheres to the synthetic resin film. Accordingly, extending the synthetic resin film toward the outer side and adding the sheet separations improves sound absorbing performance, even without increasing thickness of the sheet body.

In case the synthetic resin film, which is thin, is merely extended in area, the synthetic resin film tends to wrinkle, or roll-up or bend while the door hole seal is being coupled. But, the synthetic resin film, which has the sheet separation adhered on an outer circumferential side and which is increased in thickness by the sheet separation, is stabilized and decreased in the roll-up or bend. Accordingly, operators can grip both ends of the stabilized synthetic resin film and stick the synthetic resin film to the door inner panel.

The sound absorbing performance is further improved when the sheet separation includes highly foamed rubber-like elastic body and the outer circumferential surface, except for the outer-cabin side surface and the inner-cabin side surface, does not include the skin layer, in other words a rubber coat is removed from the outer circumferential surface.

In addition, the plurality of the sheet separations are provided along the curve which encircles the sheet body as the whole and at the distance from each other. Also, the sheet separation is long and narrow and extends in the direction that the curve extends. This configuration suppresses unevenness in the sound absorbing performance depending on positions on the door hole seal.

In addition, the sheet separation partially protrudes toward the outer side from the outer circumferential end of the synthetic resin film, not within the synthetic resin film only, for reducing proportion of synthetic resin film to the outer circumferential end of the door hole seal. This configuration simplifies coupling of the door hole seal to the door inner panel and reduces the wrinkles. Also, this configuration prevents allophone including chatter sound caused by vibration of the end of the synthetic resin film.

In addition, the outer circumferential end of the synthetic resin film includes the cutout between the sheet separations adjacent to each other along the curve and the cutout faces the internal circumferential end. This configuration further reduces the wrinkles. Also, this configuration simplifies coupling of the door hole seal to the door inner panel, even for unskilled workers, for the cutout is usable for the purpose of positioning when coupling the door hole seal to the door inner panel.

DETAILED DESCRIPTION

Referring to the drawings, a door hole seal 50 according to an embodiment of the present invention will be described.

As shown in FIG. 1 to FIG. 3 and FIG. 11, the door hole seal 50 is provided between a door inner panel 102 and a door trim 103 and covers an opening 70 on the door inner panel 102.

Figure 1:
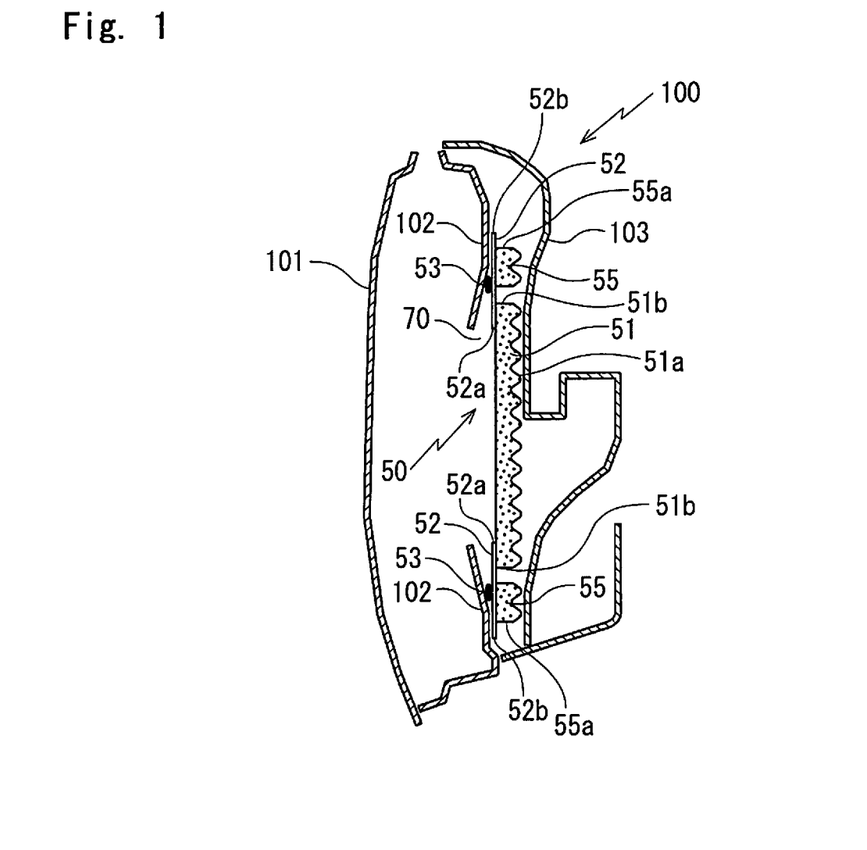
FIG. 1 is an enlarged sectional view of a door hole seal according to an embodiment of the present invention taken along line I-I of FIG. 11 coupling to a door inner panel.
Figure 2:
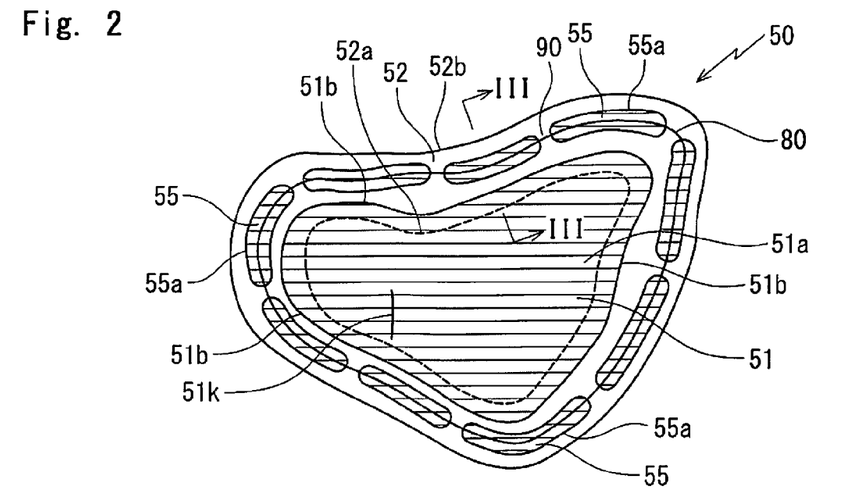
FIG. 2 is a side view of the door hole seal of FIG. 1.
Figure 3:
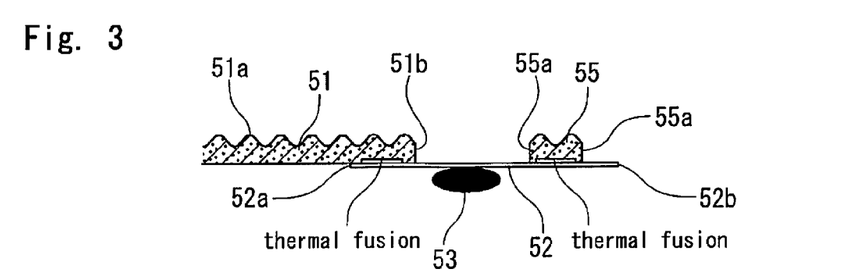
FIG. 3 is an enlarged sectional view taken along line III-III of FIG. 2.

The door hole seal 50 includes: a sheet body 51, excellent in sound insulation performance and sound absorbing performance; and a synthetic resin film 52, which is unified with the sheet body 51 and which joins the sheet body 51 to an inner-cabin side of the door inner panel 102.

The sheet body 51 has a plurality of concaves and convexes 51a formed on the inner-cabin side. Also, the sheet body 51 has a slit 51k formed thereon for pulling in and out cables or for inserting operators' hands in operations.

The synthetic resin film 52 is transparent (or semitransparent), examples of which include PE (polyethylene) film, and is reduced in thickness as compared with a thickness of the sheet body 51.

As shown in FIG. 2, the synthetic resin film 52 has a shape of a doughnut (circular). An internal circumferential end 52a, which is an inner side of the synthetic resin film 52, sticks to an outer-cabin side of an outer circumferential end 51b of the sheet body 51. An outer circumferential end 52b, which is an outer side of the synthetic resin film 52, sticks to an inner-cabin side of the door inner panel 102.

The internal circumferential end 52a of the synthetic resin film 52 sticks to the sheet body 51 by thermally fusion boding. The outer circumferential end 52b of the synthetic resin film 52 sticks to the inner-cabin side of the door inner panel 102 by butyl rubber sealing agent 53 (painted over with black).

A plurality of sheet separations 55 are provided at a distance from the sheet body 51 and between an outer circumferential end 51b of the sheet body 51 and the outer circumferential end 52b of the synthetic resin film 52. The sheet separations 55 adhere to an inner-cabin side of the synthetic resin film 52 by thermally fusion boding. A thickness of the sheet separations 55 is substantially the same as a thickness of the sheet body 51.

As shown in FIG. 1 and FIG. 2, the synthetic resin film 52 extends further toward the outer side than the prior art (FIG. 12, FIG. 13). In other words, as compared with the prior art, an area of the synthetic resin film 52 between the door inner panel 102 and the door trim 103 extends further toward an upper side on an upper side of the door 100, further toward a lower side on a lower side of the door 100, further toward a front side on a front side of the door 100, and further toward a rear side on a rear side of the door 100. The plurality of the sheet separations 55 in a form of disconnected islets are provided at a substantial center between the outer circumferential end 51b of the sheet body 51 and the outer circumferential end 52b of the synthetic resin film 52. Accordingly, the synthetic resin film 52 extends further toward the outer side than the sheet separations 55.

More specifically, the plurality of (nine, in the present embodiment) the sheet separations 55 are provided along a curve 80, which encircles the sheet body 51 as a whole, and at a distance from each other. A space (indicated by a reference numeral 90) between any two adjacent sheet separations 55, 55 is substantially the same. The sheet separation 55 is long and narrow and extends in a direction that the curve 80 extends.

The butyl rubber sealing agent 53 is provided on an outer-cabin side of the synthetic resin film 52 between the outer circumferential end 51b of the sheet body 51 and the sheet separation 55. The butyl rubber sealing agent 53 encircles the sheet body 51 as the whole in a form of a closed loop. The synthetic resin film 52, which is transparent, enables the operators to check positions of the butyl rubber sealing agent 53 through the synthetic resin film 52 from an inner-cabin side while coupling the door hole seal 50 to the door inner panel 102. The butyl rubber sealing agent 53, which is provided between the synthetic resin film 52 and the door inner panel 102, may be applied directly to the outer-cabin side of the synthetic resin film 52 or the inner-cabin side of the door inner panel 102.

The sheet body 51 includes a highly foamed rubber-like elastic body and a surface (cross section) of an outer circumferential end 51*b*, except for an outer-cabin side surface and an inner-cabin side surface, does not include a skin layer. In other words, a rubber coat is removed from the surface (cross section) of the outer circumferential end 51*b*. This configuration improves the sound absorbing performance. In the same manner as the sheet body 51, the sheet separation 55 includes the highly foamed rubber-like elastic body, and an outer circumferential surface 55*a* of the sheet separation 55, except for an outer-cabin side surface and an inner-cabin side surface, does not include the skin layer. In other words, the rubber coat is removed from the outer circumferential surface 55*a*. This configuration further improves the sound absorbing performance. Examples of the highly foamed rubber-like elastic body include elastomer and synthetic rubber including EPDM, CR, SBR, NBR.

The sheet body 51 may be a foamed sheet, which is a lamination (at least two) of a closed cell layer and an open cell layer. As mentioned above, it is preferable that the surface of the outer circumferential end 51*b* of the sheet body 51 does not include the skin layer.

In the present embodiment, the sheet body 51 is a sponge rubber sheet of EPDM having specific gravity of not more than 0.4. The specific gravity is preferably not more than 0.2, more preferably not more than 0.1.

Examples of the synthetic resin film 52 include the transparent PE (polyethylene) film. But the synthetic resin film 52 is not strictly limited to the transparent PE (polyethylene) film and any synthetic resin film 52 is usable as long as the synthetic resin film 52 stably joins the sheet body 51 to the inner-cabin side of the door inner panel 102.

Figure 9:
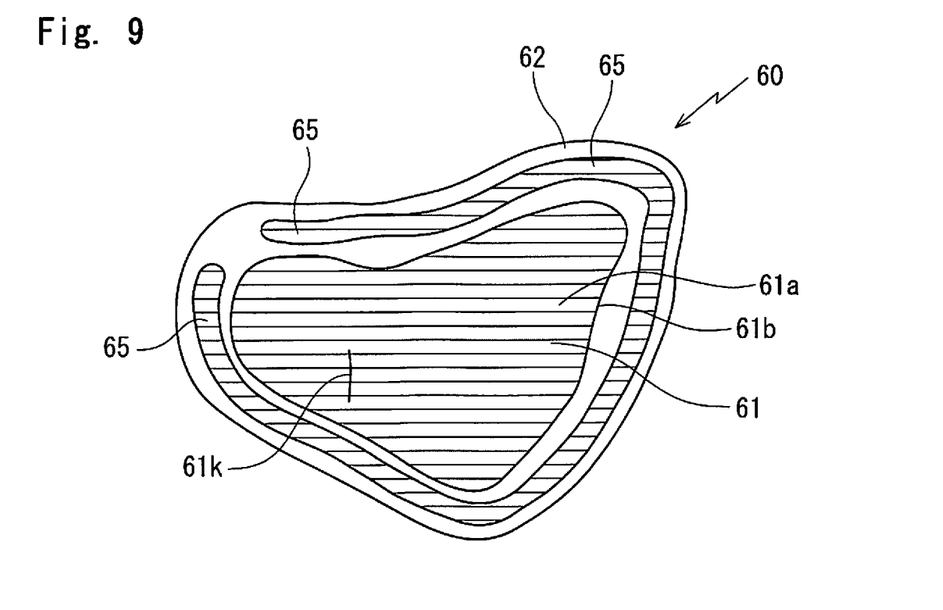
FIG. 9 is a side view of a door hole seal according to a comparative embodiment.
Figure 10:
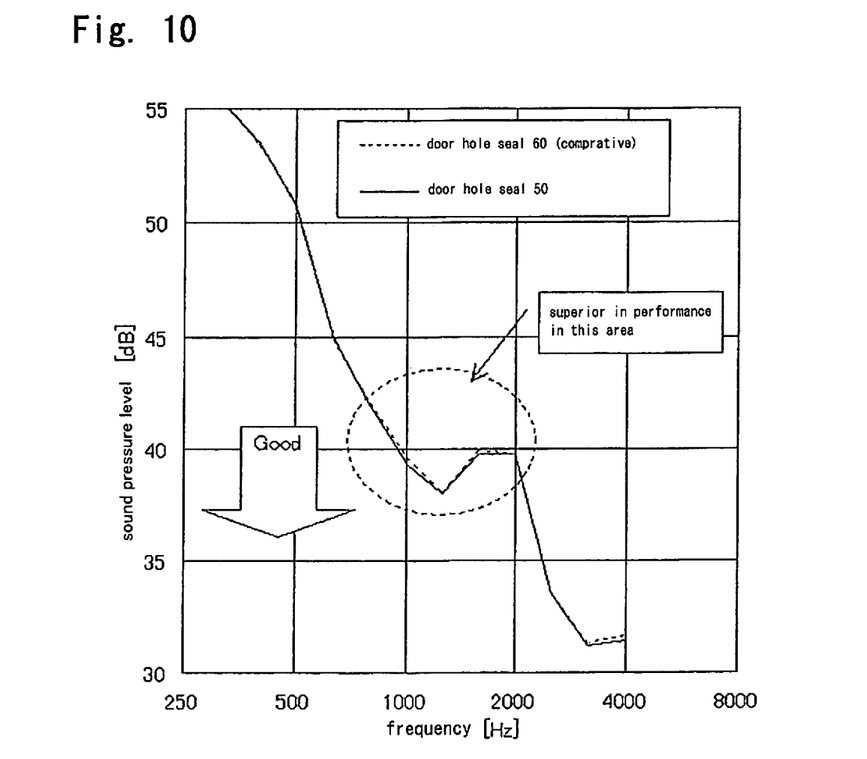
FIG. 10 is a graph illustrating frequency performance of the door hole seal according to the embodiment of the present invention and the door hole seal according to the comparative embodiment of FIG. 9.

FIG. 10 is a graph illustrating frequency performance of the door hole seal 50 according to the embodiment of the present invention (solid line) and a door hole seal 60 of FIG. 9 (dotted line).

The frequency performance was measured inside an automobile upon coupling the door hole seals 50, 60 to the automobile as shown in FIG. 1 and releasing sound outside a door outer panel 101.

A sponge rubber sheet of EPDM having a thickness of 7.4 mm forms the sheet body 51 and the sheet separation 55 of the door hole seal 50, and a sheet body 61 and a sheet separation 65 of the door hole seal 60. The synthetic resin film 52 and a synthetic resin film 62 are the same in shape and size. The sheet separation 55 differs from the sheet separation 65 in having a plurality of spaces 90 between any two adjacent sheet separations 55, 55. Specifically, the sheet separation 65 has a shape of a continuous doughnut (circular) except for a corner on an upper left in FIG. 9. The sheet separation 55 is formed by removing a plurality of parts from the sheet separation 65 and forming the spaces 90.

The graph shows that the door hole seal 50 according to the embodiment of the present invention is superior to the door hole seal 60 according to the comparative example in the sound absorbing performance especially around 1000 Hz.

According to the door hole seal 50 of the embodiment of the present invention, the plurality of the sheet separations 55 are provided at a distance from the sheet body 51 and between the outer circumferential end 51*b* of the sheet body 51 and the outer circumferential end 52*b* of the synthetic resin film 52. Also, the sheet separations 55 adhere to the synthetic resin film 52. Accordingly, extending the synthetic resin film 52 toward the outer side and adding the sheet separations 55 at the distance from each other further improves the sound absorbing performance.

The sheet separations 55 include the highly foamed rubber-like elastic body. The outer circumferential surface 55*a*, except for the outer-cabin side surface and the inner-cabin side surface, does not include the skin layer, in other words the rubber coat is removed from the outer circumferential surface 55*a*. In addition, the plurality of the sheet separations 55 are provided along the curve 80 (outer ring), which encircles the sheet body 51 as the whole, and at the distance from each other. Also, the sheet separations 55 are long and narrow and extend in the direction that the curve 80 extends. The sheet separations 55 are not provided on positions which tend to touch the door trim 103 on the inner-cabin side and other members inside the door so that the positions are formed into the space 90 without the separations 55 thereon. This configuration prevents the sheet separations 55 from touching the door trim 103 or other members, and suppresses unevenness in the sound absorbing performance depending on positions on the door hole seal 50. The sheet separation 65, which has the shape of the continuous doughnut (circular) without the space 90 thereon, may be unintentionally compressed or deformed when touching the door trim 103 or other members. Resultant compression or distortion on the sheet separation 65 conceivably spreads to a distant position of the continuous doughnut shape and causes unevenness in the sound absorbing performance.

Figure 4:
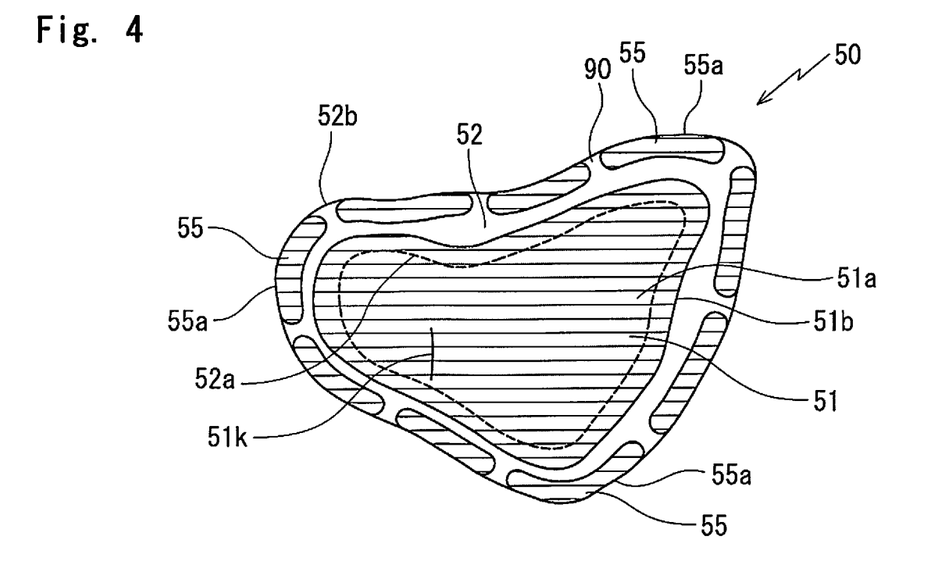
FIG. 4 is a side view of a door hole seal according to another embodiment of the present invention.

In the present embodiment, the plurality of the sheet separations 55 are provided at the substantial center between the outer circumferential end 51*b* of the sheet body 51 and the outer circumferential end 52*b* of the synthetic resin film 52. Alternatively, as shown in FIG. 4, the outer circumferential end 52*b* of the synthetic resin film 52 may extend up to a position of an outer circumferential surface 55*a* of the sheet separations 55 so that the sheet separations 55 are close to the outer circumferential end 52*b* of the synthetic resin film 52.

Figure 5:
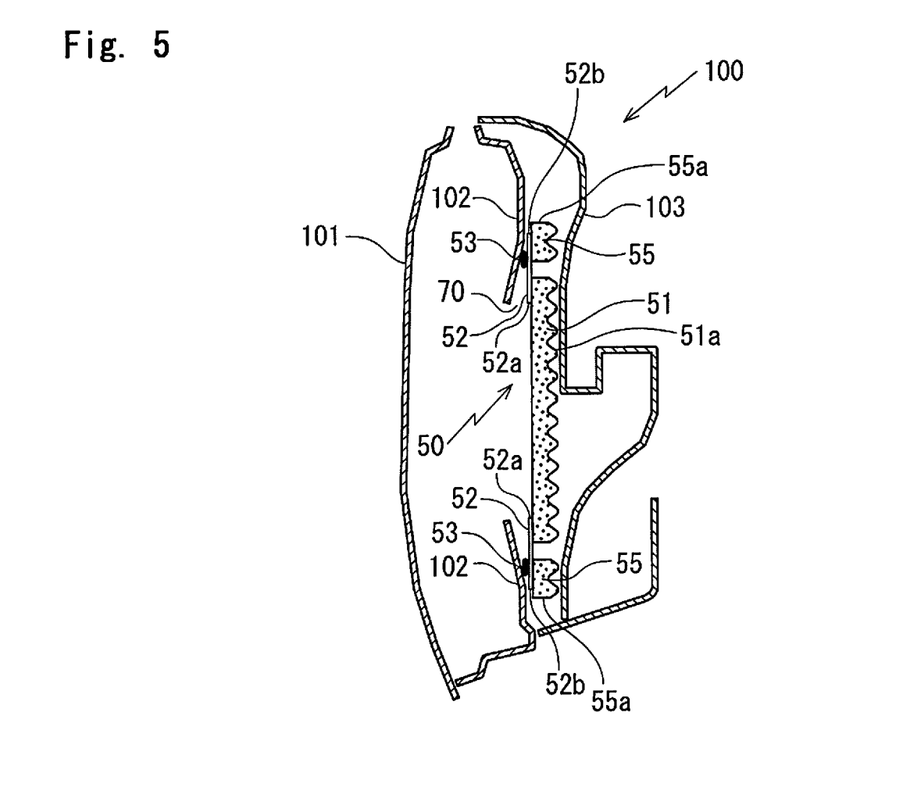
FIG. 5 is an enlarged sectional view of a door hole seal according to still another embodiment of the present invention.
Figure 6:
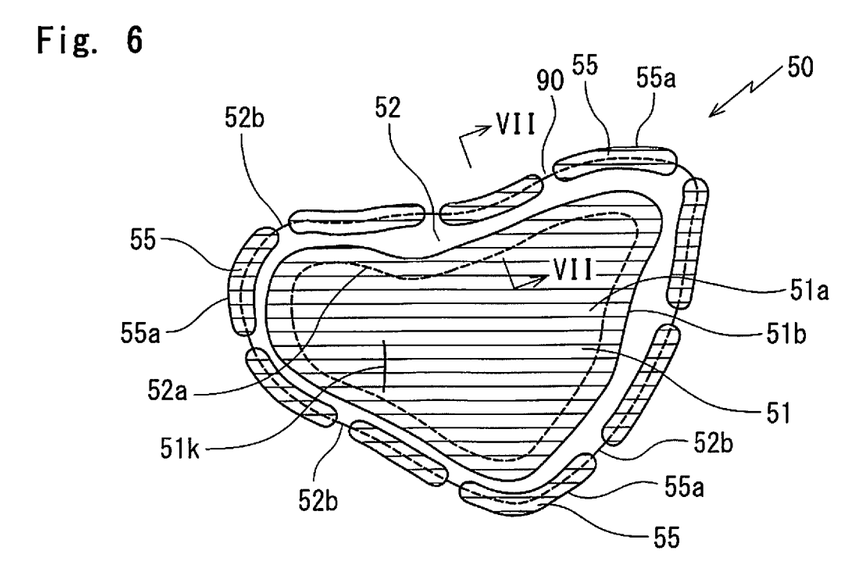
FIG. 6 is a side view of the door hole seal of FIG. 5.
Figure 7:
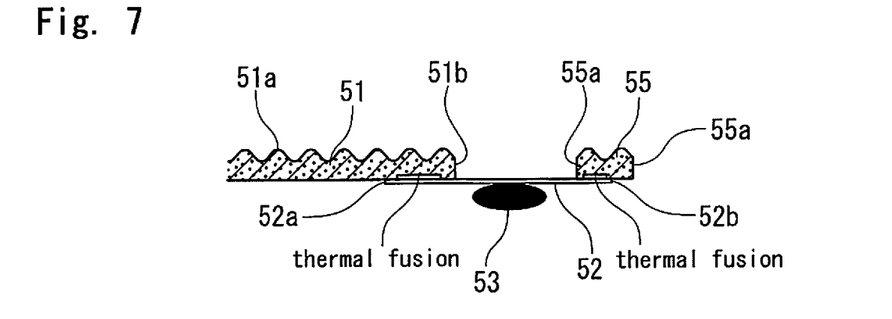
FIG. 7 is an enlarged sectional view taken along line VII-VII of FIG. 6.

Also, as shown in FIG. 5 to FIG. 7, a part of each of the sheet separations 55, may protrude toward an outer side from the outer circumferential end 52*b* of the synthetic resin film 52 (about a half of the sheet separations 55 in FIG. 5 to FIG. 7), not the sheet separations 55 as the whole within the synthetic resin film 52.

With this configuration, proportion of the synthetic resin film 52 to the outer circumferential end of the door hole seal 50 is reduced. In other words, the synthetic resin film 52 as the outer circumferential end of the door hole seal 50 appears only on the spaces between any two adjacent sheet separations 55, 55. This configuration decreases roll-up or bend on the synthetic resin film 52 and simplifies coupling of the door hole seal 50 to the door inner panel 102. Also, this configuration prevents allophone including chatter sound caused by vibration of the end of the synthetic resin film 52.

Figure 8:
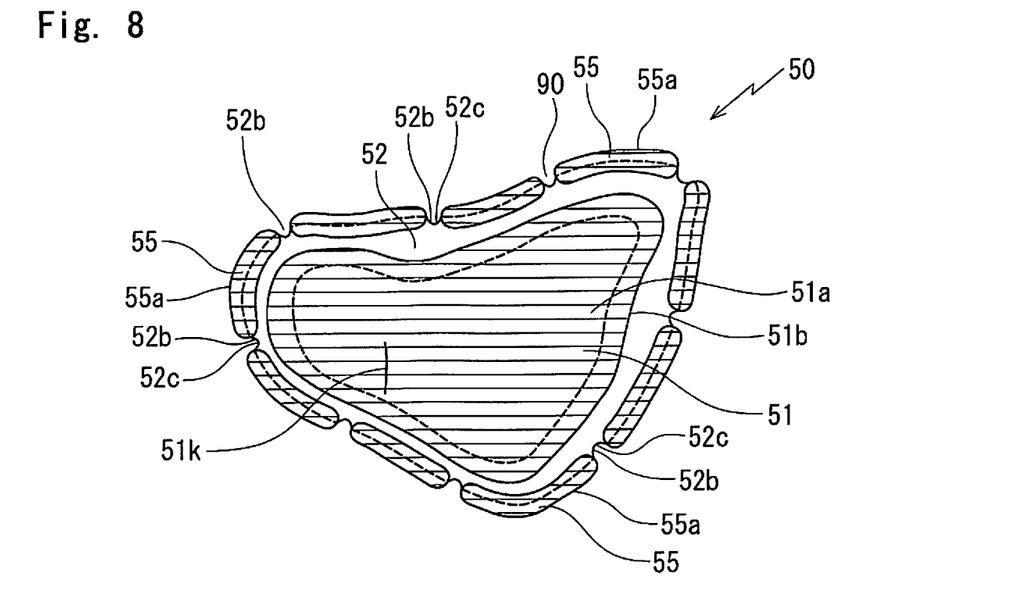
FIG. 8 is a side view of a door hole seal according to still another embodiment of the present invention.

Also, as shown in FIG. 8, the outer circumferential end 52*b* of the synthetic resin film 52 may include a cutout 52*c* between the sheet separations 55, 55 adjacent to each other. The cutout 52*c* has a shape of a curved surface and faces the internal circumferential end 52*a*.

The outer circumferential end 52*b* of the synthetic resin film 52 includes the cutout 52*c* between the sheet separations 55, 55 and the cutout 52*c* faces the internal circumferential end 52*a*. This configuration further reduces the wrinkles. Also, the cutout 52c is usable for the purpose of positioning when coupling the door hole seal 50 to the door inner panel 102.

This configuration simplifies coupling of the door hole seal 50 to the door inner panel 102 even for unskilled workers.

In the present embodiment, the plurality of the sheet separations 55 are long and narrow, have substantially the same shapes, are provided at the distance from each other and orderly along the curve 80 which encircles the sheet body 51. But even in case the sheet separations 55, which vary in size, are provided disorderly on the synthetic resin film 52, the sound absorbing performance of the door hole seal 50 is improved, as compared with absence of the sheet separations 55. Also, by altering the distance between the sheet separations 55, 55 in consideration of the concaves and convexes of the door inner panel 102 and the door trim 103 or arrangement of electric apparatus, the sheet separations 55, which include the foamed body, are not deformed unnecessarily and perform the sound absorbing performance.

We claim:

1. A door hole seal comprising:
   a sheet body configured to operably couple to a door inner panel for covering an opening on said door inner panel;
   a synthetic resin film for joining the sheet body to the door inner panel, said synthetic resin film being transparent or semitransparent, the synthetic resin film including:
   an internal circumferential end which sticks to said sheet body; and an outer circumferential end which sticks to an inner-cabin side of said door inner panel by adhesive; and
   a sheet separation provided at a distance from said sheet body and between an outer circumferential end of said sheet body and the outer circumferential end of said synthetic resin film, the sheet separation adhering to said synthetic resin film;
   wherein a plurality of said sheet separations are provided along a curve and at a distance from each other, the curve encircling the sheet body as a whole.

2. The door hole seal as claimed in claim 1, wherein said sheet separation extends in a direction that said curve extends.

3. The door hole seal as claimed in claim 2, wherein said sheet separation protrudes toward an outer side from the outer circumferential end of said synthetic resin film.

4. The door hole seal as claimed in claim 3, wherein the outer circumferential end of said synthetic resin film includes a cutout between the sheet separations adjacent to each other along said curve, the cutout facing the internal circumferential end.

5. The door hole seal as claimed in claim 1, wherein said adhesive is provided between the outer circumferential end of said sheet body and said sheet separation, the adhesive encircling said sheet body as the whole.

6. The door hole seal as claimed in claim 2, wherein said adhesive is provided between the outer circumferential end of said sheet body and said sheet separation, the adhesive encircling said sheet body as the whole.

7. The door hole seal as claimed in claim 3, wherein said adhesive is provided between the outer circumferential end of said sheet body and said sheet separation, the adhesive encircling said sheet body as the whole.

8. The door hole seal as claimed in claim 4, wherein said adhesive is provided between the outer circumferential end of said sheet body and said sheet separation, the adhesive encircling said sheet body as the whole.

9. The door hole seal as claimed in claim 1, wherein said sheet separation comprises a foamed rubber-like elastic body and an outer circumferential surface of the sheet separation except for an outer-cabin side surface and an inner-cabin side surface is ineffective in comprising a skin layer.

10. The door hole seal as claimed in claim 2, wherein said sheet separation comprises a foamed rubber-like elastic body and an outer circumferential surface of the sheet separation except for an outer-cabin side surface and an inner-cabin side surface is ineffective in comprising a skin layer.

11. The door hole seal as claimed in claim 3, wherein said sheet separation comprises a foamed rubber-like elastic body and an outer circumferential surface of the sheet separation except for an outer-cabin side surface and an inner-cabin side surface is ineffective in comprising a skin layer.

12. The door hole seal as claimed in claim 4, wherein said sheet separation comprises a foamed rubber-like elastic body and an outer circumferential surface of the sheet separation except for an outer-cabin side surface and an inner-cabin side surface is ineffective in comprising a skin layer.

13. The door hole seal as claimed in claim 5, wherein said sheet separation comprises a foamed rubber-like elastic body and an outer circumferential surface of the sheet separation except for an outer-cabin side surface and an inner-cabin side surface is ineffective in comprising a skin layer.

14. The door hole seal as claimed in claim 6, wherein said sheet separation comprises a foamed rubber-like elastic body and an outer circumferential surface of the sheet separation except for an outer-cabin side surface and an inner-cabin side surface is ineffective in comprising a skin layer.

15. The door hole seal as claimed in claim 7, wherein said sheet separation comprises a foamed rubber-like elastic body and an outer circumferential surface of the sheet separation except for an outer-cabin side surface and an inner-cabin side surface is ineffective in comprising a skin layer.

16. The door hole seal as claimed in claim 8, wherein said sheet separation comprises a foamed rubber-like elastic body and an outer circumferential surface of the sheet separation except for an outer-cabin side surface and an inner-cabin side surface is ineffective in comprising a skin layer.

17. A door hole seal comprising:
   a sheet body configured to operably couple to a door inner panel for covering an opening on said door inner panel;
   a synthetic resin film for joining the sheet body to the door inner panel, said synthetic resin film being transparent or semitransparent, the synthetic resin film including:
   an internal circumferential end which sticks to said sheet body; and an outer circumferential end which sticks to an inner-cabin side of said door inner panel by adhesive; and
   a sheet separation provided at a distance from said sheet body and between an outer circumferential end of said sheet body and the outer circumferential end of said synthetic resin film, the sheet separation adhering to said synthetic resin film;
   wherein said adhesive is provided between the outer circumferential end of said sheet body and said sheet separation, the adhesive encircling said sheet body as a whole.

18. The door hole seal as claimed in claim 17, wherein said sheet separation comprises a foamed rubber-like elastic body and an outer circumferential surface of the sheet separation except for an outer-cabin side surface and an inner-cabin side surface is ineffective in comprising a skin layer.

19. A door hole seal comprising:
- a sheet body configured to operably couple to a door inner panel for covering an opening on said door inner panel;
- a synthetic resin film for joining the sheet body to the door inner panel, said synthetic resin film being transparent or semitransparent, the synthetic resin film including: an internal circumferential end which sticks to said sheet body; and an outer circumferential end which sticks to an inner-cabin side of said door inner panel by adhesive; and
- a sheet separation provided at a distance from said sheet body and between an outer circumferential end of said sheet body and the outer circumferential end of said synthetic resin film, the sheet separation adhering to said synthetic resin film;
- wherein said sheet separation comprises a foamed rubber-like elastic body and an outer circumferential surface of the sheet separation except for an outer-cabin side surface and an inner-cabin side surface is ineffective in comprising a skin layer.

\* \* \* \* \*